United States Patent
Takahashi

(10) Patent No.: US 11,048,398 B2
(45) Date of Patent: Jun. 29, 2021

(54) INFORMATION DISPLAY APPARATUS AND INFORMATION DISPLAY METHOD

(71) Applicant: Yamaha Corporation, Hamamatsu (JP)

(72) Inventor: Daisuke Takahashi, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 16/393,487

(22) Filed: Apr. 24, 2019

(65) Prior Publication Data

US 2019/0250807 A1 Aug. 15, 2019

Related U.S. Application Data

(63) Continuation of application No. PCT/JP2017/037798, filed on Oct. 19, 2017.

(30) Foreign Application Priority Data

Nov. 1, 2016 (JP) .............................. JP2016-213966

(51) Int. Cl.
*G06F 3/048* (2013.01)
*G06F 3/0484* (2013.01)
(Continued)

(52) U.S. Cl.
CPC ........ G06F 3/04847 (2013.01); G06F 3/0481 (2013.01); G06F 3/0486 (2013.01); G06F 3/04817 (2013.01); H04R 3/00 (2013.01)

(58) Field of Classification Search
CPC ...... G06F 3/0488; G06F 3/0484; G06F 3/061; H04N 7/181; H04N 21/2187;
(Continued)

(56) References Cited

U.S. PATENT DOCUMENTS

| 4,862,159 A | * | 8/1989 | Marusa | ..................... | H03G 3/00 |
| | | | | | 340/4.37 |
| 2009/0110369 A1 | * | 4/2009 | Takahashi | .......... | G11B 27/3027 |
| | | | | | 386/357 |

(Continued)

FOREIGN PATENT DOCUMENTS

| JP | 8-335111 A | 12/1996 |
| JP | 2009-151398 A | 7/2009 |
| JP | 2015-204020 | 11/2015 |

OTHER PUBLICATIONS

Baker et al., A Flexible Instrumentation and Control System Applied to a Power and Machines Laboratory; IEEE; 1984; 8 pages.*

(Continued)

*Primary Examiner* — Linh K Pham
(74) *Attorney, Agent, or Firm* — Crowell & Moring LLP

(57) ABSTRACT

An information display apparatus includes a display and a controller. The display displays widgets that include a main widget and a plurality of sub-widgets that indicate states of devices or states of functions installed on the devices. The controller executes a process of placing a plurality of sub-widgets to the main widget; a process of setting the device or the function that is associated with each of the plurality of sub-widgets; a process of setting a condition for the device or a condition for the function that is associated with each of the plurality of sub-widgets; and a process of setting a relationship between conditions set for the plurality of sub-widgets and a condition set for the main widget.

16 Claims, 11 Drawing Sheets

(51) Int. Cl.
*G06F 3/0486* (2013.01)
*G06F 3/0481* (2013.01)
*H04R 3/00* (2006.01)

(58) Field of Classification Search
CPC ....... H04N 21/44008; H04N 21/44222; Y02D 30/50; Y02D 10/00; G09G 2330/022; G09G 5/14
See application file for complete search history.

(56) References Cited

U.S. PATENT DOCUMENTS

| | | | |
|---|---|---|---|
| 2009/0138110 A1* | 5/2009 | Kohyama | H04R 29/008 700/94 |
| 2009/0232331 A1* | 9/2009 | Suyama | H04R 27/00 381/120 |
| 2017/0256986 A1 | 9/2017 | Demachi | |

OTHER PUBLICATIONS

International Search Report (PCT/ISA/210) issued in PCT Application No. PCT/JP2017/037798 dated Nov. 28, 2017 with English translation (six(6) pages).
Japanese-language Written Opinion (PCT/ISA/237) issued in PCT Application No. PCT/JP2017/037798 dated Nov. 28, 2017 (three (3) pages).
"Network Amp. Manager-Owner's Manual", Yamaha Corp. 2003, pp. 1-43, (43 pages).
Extended European Search Report issued in European Application No. 17867810.8 dated May 26, 2020 (eight (8) pages).
Japanese-language Office Action issued in Japanese Application No. 2016-213966 dated Oct. 20, 2020 with English translation (eight (8) pages).

* cited by examiner

INFORMATION DISPLAY APPARATUS AND INFORMATION DISPLAY METHOD

CROSS REFERENCE TO RELATED APPLICATIONS

The present application is a continuation application of International Patent Application No. PCT/JP2017/037798, filed on Oct. 19, 2017, which claims priority to Japanese Patent Application No. 2016-213966, filed on Nov. 1, 2016. The contents of these applications are incorporated herein by reference in their entirety.

BACKGROUND OF THE INVENTION

1. Technical Field

The present invention, in some embodiments thereof, relates to an information display apparatus and an information display method that display information.

2. Description of the Related Art

A conventional application program has a function to perform a remote control and remote monitoring of a plurality of amplifiers. The application program accepts, for example, a setting of a threshold value for a temperature of a heat sink. With the application program, a warning is emitted when the temperature of the heat sink exceeds the threshold value.

SUMMARY OF THE INVENTION

However, the conventional application program is the one that performs individual management of a plurality of devices, and thus has been unable to perform management of as far as the entire system. As the number of devices within a system increases, the number of objects to manage increases; then, it becomes difficult to perform management of the entire system.

On that account, the present invention, in some embodiments thereof, is directed to providing an information display apparatus and an information display method that are capable of performing management of an entire system.

An information display apparatus includes a display and a controller. The display displays widgets that include a main widget and a plurality of sub-widgets that indicate a state of a device or a state of a function installed on the device. The controller executes a process of placing a plurality of sub-widgets to the main widget; a process of setting the device or the function that is associated with each of the plurality of sub-widgets; a process of setting a condition for the device or a condition for the function that is associated with each of the plurality of sub-widgets; and a process of setting a relationship between conditions set for the plurality of sub-widgets and a condition set for the main widget.

The information display apparatus is capable of performing management of an entire system.

DETAILED DESCRIPTION OF THE PREFERRED EMBODIMENTS

An information display apparatus according to an embodiment of the present invention sets a main widget that integrates a plurality of sub-widgets. Also, the information display apparatus sets a condition for each sub-widget, and sets a relationship between conditions for the plurality of sub-widgets and the main widget. Thus, by performing management of the main widget, the user can perform management of states of a plurality of devices or functions that are allocated to a plurality of sub-widgets.

Figure 1:
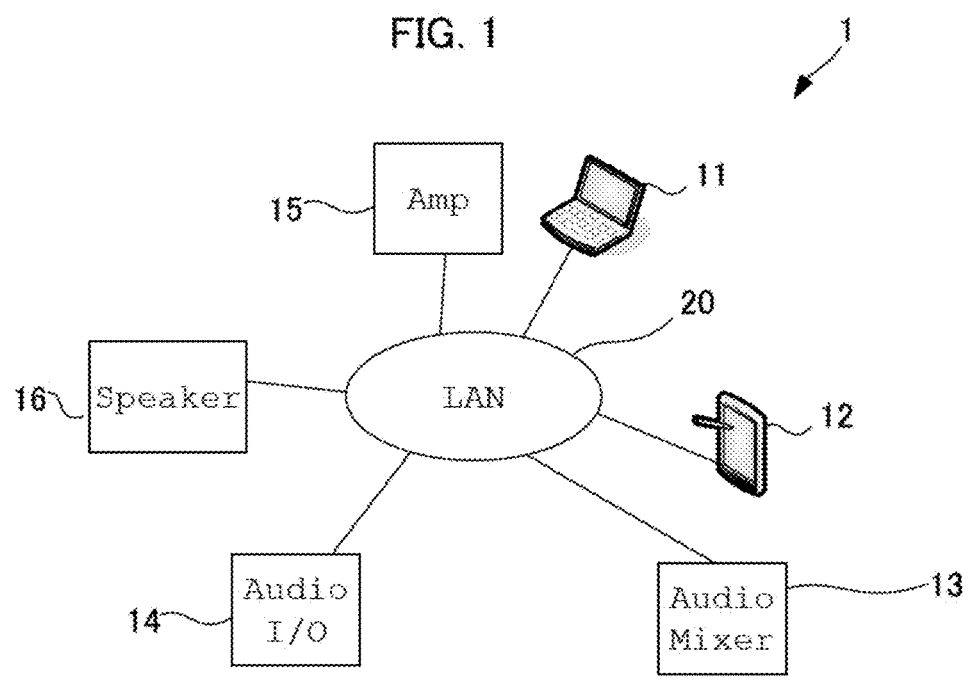
FIG. 1 is a block diagram showing a configuration of a sound system.

FIG. 1 is a block diagram showing a configuration of a sound system. The sound system 1 includes a laptop PC 11, a tablet PC 12, an audio mixer 13, an audio I/O unit 14, an amplifier 15, a speaker 16 and a LAN (Local Area Network) 20. The laptop PC 11, the tablet PC 12, the audio mixer 13, the audio I/O unit 14, the amplifier 15 and the speaker 16 are connected to each other through the LAN (Local Area Network) 20. However, in the present invention, connection mode for each device is not limited to a network connection through a LAN. For example, each device may be connected through a MIDI (Musical Instrument Digital Interface).

Figure 2:
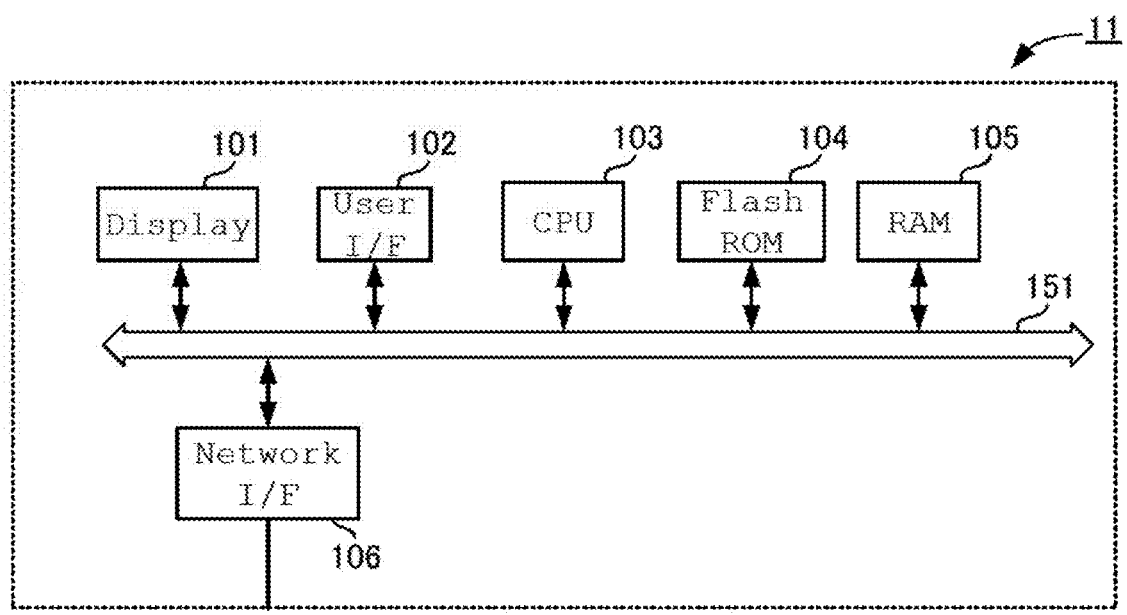
FIG. 2 is a block diagram showing a configuration of a PC.

The laptop PC 11 and the tablet PC 12 are respectively examples of the information display apparatus of the present invention, and are general purpose computers (information processing devices). FIG. 2 is a block diagram showing a configuration of the PC 11. The laptop PC 11 includes a display 101, a user interface (I/F) 102, a CPU 103, a flash ROM 104, a RAM 105 and a network interface (I/F) 106. These components are connected to a bus 151. The tablet PC 12 also has a configuration similar or same to that of the laptop PC 11.

The display 101 consists of, for example, a LCD (Liquid Crystal Display), and displays various information. The user I/F 102 consists of, for example, a mouse, a keyboard, a touch panel and/or the like, and receives user's operation. The user I/F 102 corresponds to a receiver of the present invention. The user I/F 102, together with the display 101, constitutes a GUI (Graphical User Interface).

The CPU 103 corresponds to a controller, an information obtainer and so forth of the present invention. The CPU 103 reads out a program that is stored in the flash ROM 104, which is a storage medium, into the RAM 105 and realizes a predetermined function. For example, the CPU 103 realizes a GUI by causing the display 101 to display an image of an operation portion (receiver) for receiving a user's operation and then by receiving, through the user I/F 102, a selection operation or the like to an image of the operation portion. Here, the program is not necessarily stored in the flash ROM 104 in the own apparatus, but may be stored in a storage medium in an external device such as a server or the like, as is well-known. In such a case, the CPU 103 may each time read out the program from the server into the RAM 105 to execute.

Figure 3:
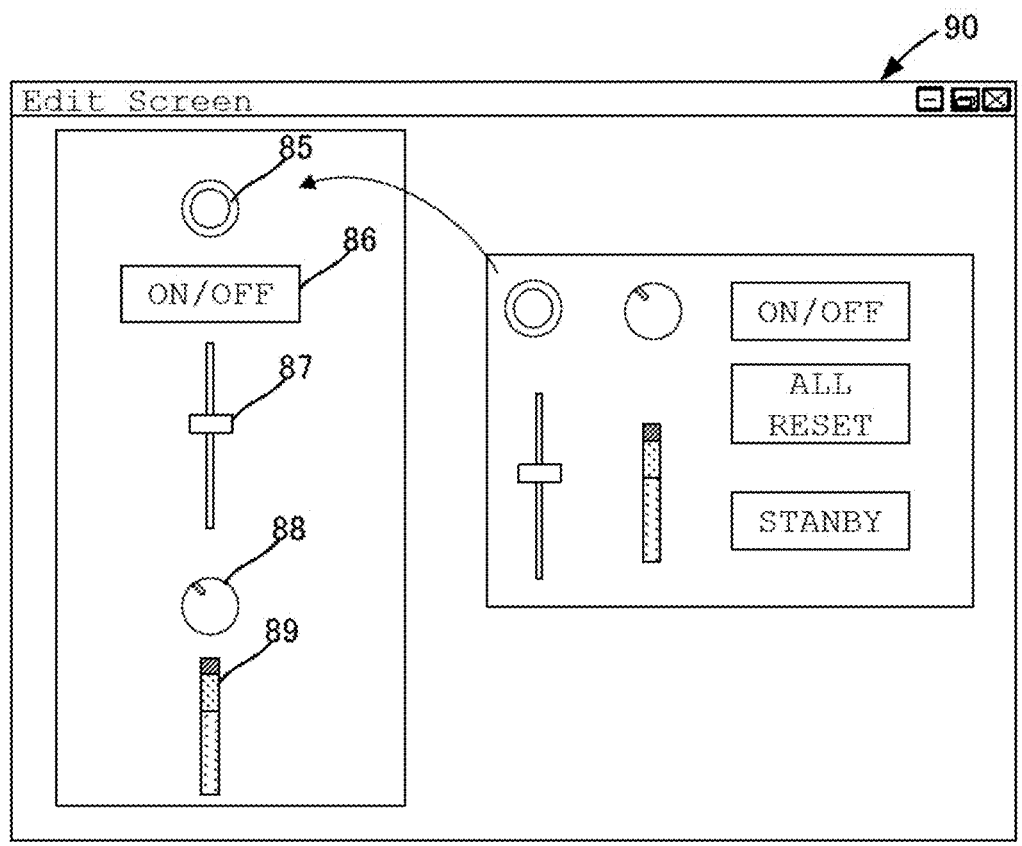
FIG. 3 is a diagram showing an example of a GUI.

FIG. 3 is an example of the GUI that is displayed by the display 101. With the GUI shown in this example, the user performs operations such as placement of widgets, setting of devices or functions that are to be associated with the widgets, and so forth. A widget is an element to constitute a GUI. In the example of FIG. 3, as widgets, an alert indicator 85, an ON/OFF button 86, a slider 87, a knob 88 and a meter 89 are displayed.

Figure 4:
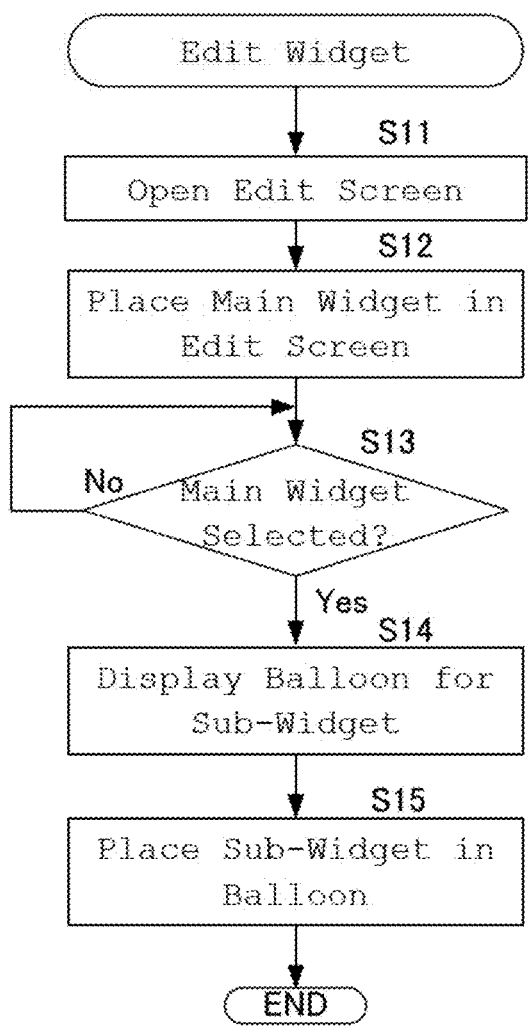
FIG. 4 is a flow chart showing an operation of the PC.

FIG. 4 is a flow chart showing an operation of the CPU 103. The CPU 103, on receiving edit instructions of widgets through the user I/F 102, causes an edit screen 90 shown in FIG. 3 to open (S11).

In the edit screen 90, the CPU 103 first places a main widget (S12). The main widget is a widget that integrates a plurality of below-mentioned sub-widgets into one. In the example of FIG. 3, the alert indicator 85, the ON/OFF button 86, the slider 87, the knob 88 and the meter 89 are each correspond to a main widget. The user can, as indicated on the right side in the edit screen 90 in FIG. 3, place main widgets that are going to be used by drugging and dropping each of a plurality of main widgets.

Figure 5:
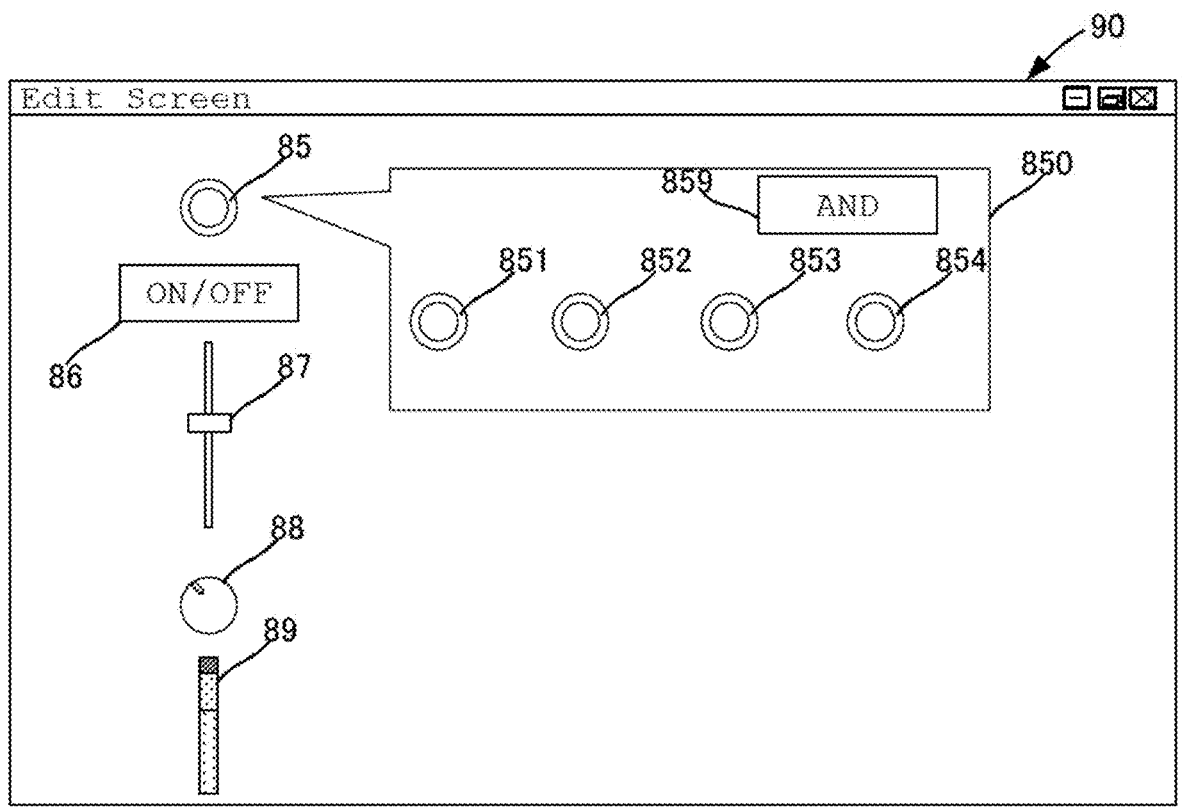
FIG. 5 is a diagram showing an example of the GUI.

Then, the CPU 103 determines whether or not the user has selected a main widget (S13). If the user does not select a main widget (S13, No), the CPU 103 repeats the determination of S13. If the user selects a main widget (S13, Yes), the CPU 103, as shown in FIG. 5, causes a balloon image 850 for sub-widgets 850 to be displayed (S14), and then causes the sub-widgets to be placed in the balloon image 850 (S15). For example, in FIG. 5, since the user has selected the alert indicator 85, the CPU 103 causes a balloon image 850 corresponding to the alert indicator 85 to be displayed. Then, the CPU 103 causes a plurality of sub-widgets to be displayed inside the balloon image 850. In this example, the CPU 103 causes four sub-widgets consisting of a sub-indicator 851, a sub-indicator 852, a sub-indicator 853 and a sub-indicator 854 to be displayed. The number of sub-widgets displayed in the balloon image 850 can also be specified by the user, and so can deletion or addition thereof be made.

Each sub-widget is associated with a predetermined device or a predetermined function of the device. For example, the sub-indicator 851 is associated with the amplifier 15, the sub-indicator 852 is associated with the audio mixer 13. Also, the sub-indicator 853 is associated with the speaker 16, and the sub-indicator 854 is associated with the audio I/O unit 14. Further, a sub-widget can be associated with one constituent of a device (for example, a heat sink for one channel of the amplifier, or the like), instead of the device as a whole. Also, each sub-widget can be associated with a predetermined function (for example, a level controller) installed on each device.

Moreover, the laptop PC 11 may detect each device inside the system by performing a network search or the like and then automatically associate each sub-widget with each device; otherwise, the user may manually associate any sub-widget with any device or any function. In the case where each sub-widget is automatically associated with each device, the laptop PC 11 may, for example, obtain information on each device name (for example, computer name, MAC address, IP address, or the like) and then associate a sub-widget with the device name.

Figure 6:
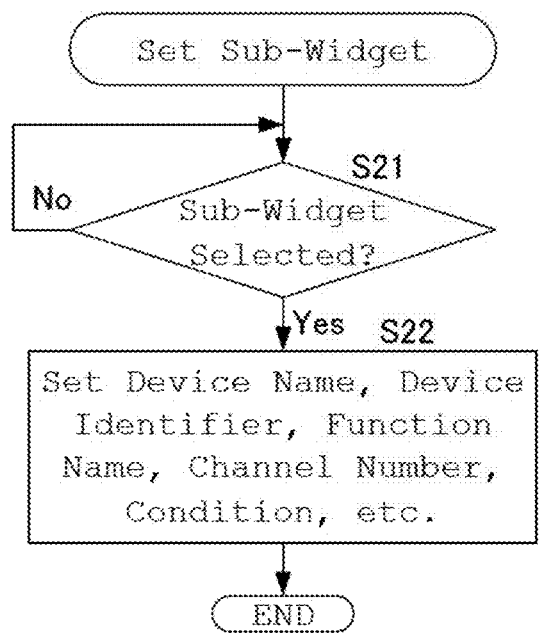
FIG. 6 is a flow chart showing an editing operation of a sub-widget.
Figure 7:
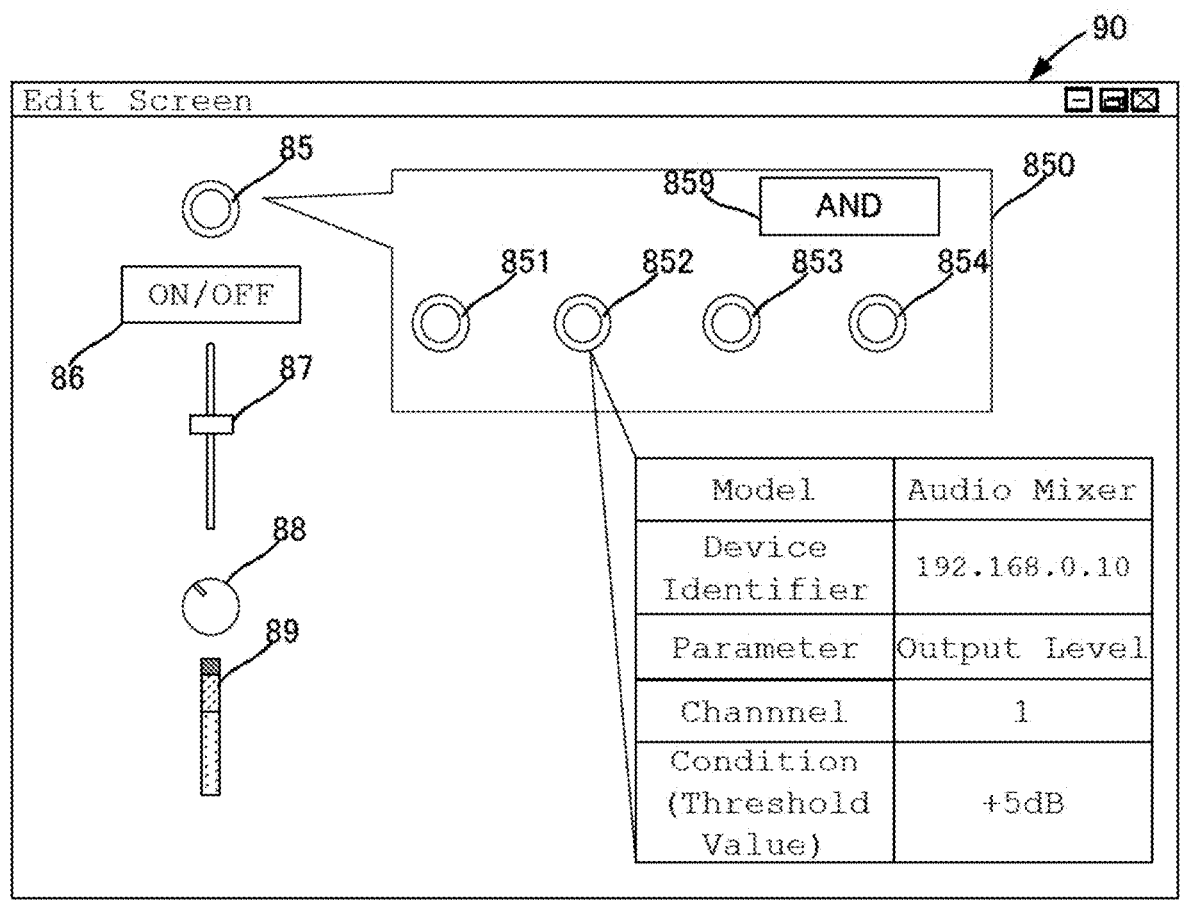
FIG. 7 is a diagram showing an example of an edit screen.

Subsequently, FIG. 6 is a flow chart showing an editing operation of a sub-widget, and FIG. 7 is a diagram showing an example of an edit screen 90.

The CPU 103 determines whether or not the user has selected a sub-widget (S21). If the user does not select a sub-widget, the CPU 103 repeats the determination of S21 (S21, No). If the user has selected each sub-widget and has given edit instructions (S21, Yes), the CPU 103 causes the sub-widget edit screen 90 as shown in FIG. 7 to be displayed, and receives each editing operation (S22).

The user can edit, for each sub-widget, device name (Model), Device Identifier, function name (Parameter), channel number (Channel), condition and so forth.

The device name is automatically inputted by contacting the target device and so on; otherwise, the user can edit freely. As to the device identifier, although an IP address is displayed in the example of FIG. 7, a MAC address or specific identification information such as serial number or the like may be used, instead. A function name becomes capable of being edited when a sub-widget is associated with a predetermined function in a predetermined device. In this example, in order to perform management of a level controller (fader) of an output channel 1 with the sub-indicator 852 being associated with the audio mixer 13, "Output Level" is displayed as the function name. The channel number corresponds to a channel number for the parameter that is associated with the sub-widget. In this example, channel is set. Therefore, the sub-indicator 852 becomes a widget to indicate a state (alert) of the level controller for the output channel 1 of the audio mixer 13.

The condition (threshold value) indicated in the bottom line means a condition that is set for the sub-widget. For a device or a function that is associated with each sub-widget, each predetermined condition is set. For example, the sub-indicator 851 is associated with the heat sink for the channel 1 of the amplifier 15. Since the sub-indicator 851 is an alert indicator, for the sub-indicator 851 an alert condition is set. Also, in the example shown in FIG. 7, for the sub-indicator 852 a condition of +5 dB is set as a level of the output channel 1. Thus, when the level of the output channel 1 of the audio mixer 13 becomes greater than or equal to +5 dB, the condition for the sub-indicator 852 is met. If the condition is met, the CPU 103 performs an alert notification by causing a corresponding widget (indicator) to be turned on or blinked. Otherwise, the CPU 103 may perform an alert notification by causing an indication color of the indicator to change. Moreover, it is also possible for the CPU 103 to cause multi-step conditions to be set with the indication color being changed multi-stepwise. For example, the CPU 103 causes the indication color of the indicator to become yellow in a case where the level becomes greater than or equal to +3 dB, and causes the indication color of the indicator to become red in a case where the level becomes greater than or equal to +5 dB.

Figure 8:
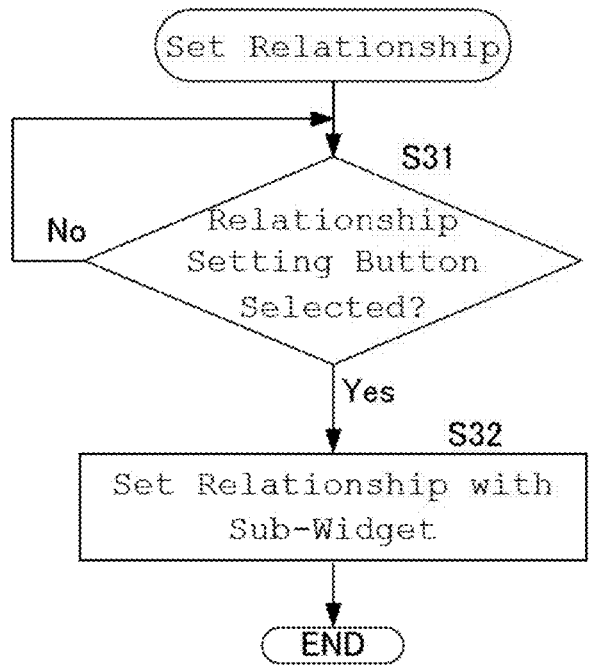
FIG. 8 is a flow chart showing an operation of the PC.
Figure 9:
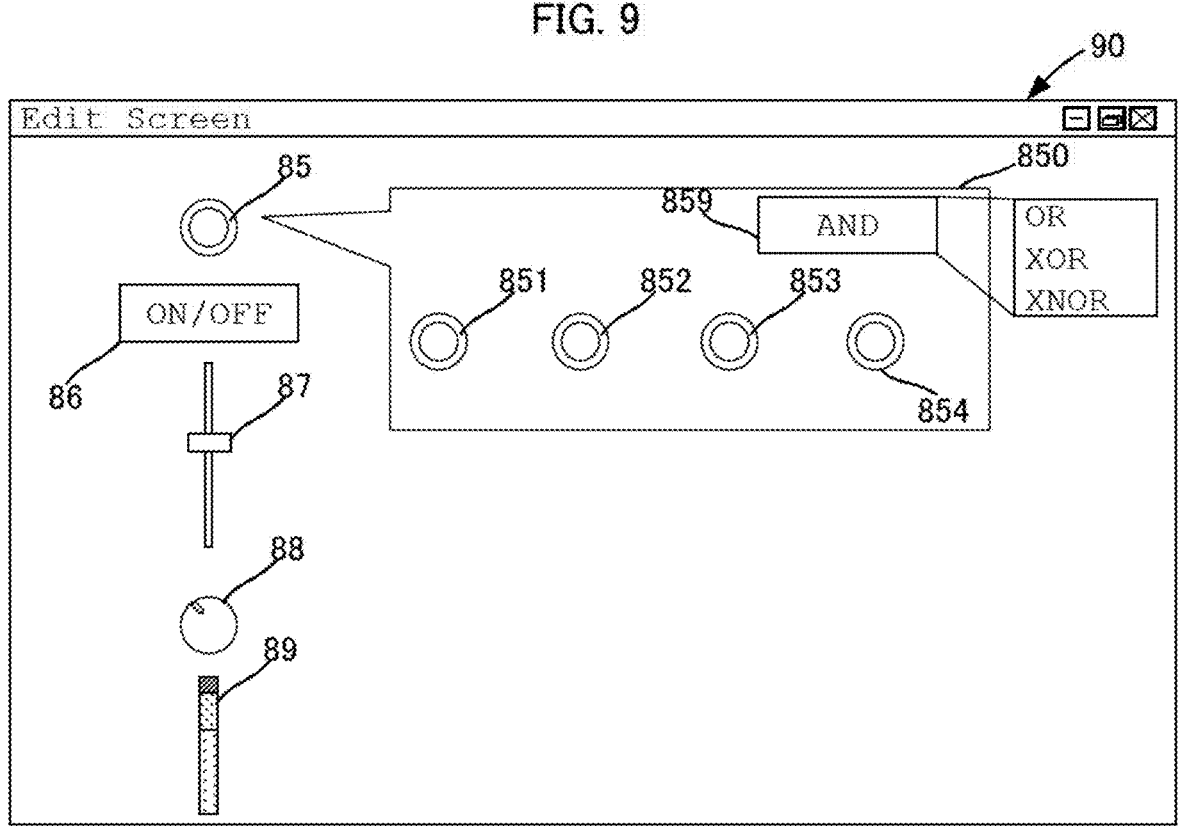
FIG. 9 is a diagram showing an example of a relationship setting screen.

In the above-mentioned manner, the user can edit each sub-widget. Next, FIG. 8 is a flow chart showing an operation of the CPU 103 in a case of setting a relationship between conditions set for each sub-widget and a condition set for the main widget. FIG. 9 is a diagram showing an example of an edit screen 90 for setting the relationship.

The CPU 103 determines whether or not the user has selected a relationship setting button 859 (S31). If the user does not select the relationship setting button 859, the CPU 103 repeats the determination of S31 (S31, No). If the user selects the relationship setting button 859 (S31, Yes), the CPU 103 causes a screen for setting a relationship between conditions set for each sub-widget and a condition set for the main widget as shown in FIG. 9 to be displayed (S32).

The user selects, as the relationship between conditions set for the sub-widgets and a condition set for the main widget, a logical expression of the conditions set for a plurality of sub-widgets, for example. In the example of FIG. 9, the user selects one from among "AND", "OR", "XOR" and "XNOR". When "AND" is selected, the CPU 103 decides, as the relationship, that the condition for the main widget is met when all the conditions for the sub-widgets are met. As a result, the alert condition for the alert indicator 85 as the main widget is met when all the alert conditions for the sub-indicator 851, the sub-indicator 852, the sub-indicator 853 and the sub-indicator 854 are met.

When "OR" is selected, the CPU 103 decides, as the relationship, that the condition for the main widget is met when a condition for at least any one corresponding sub-widget is met. When "XNOR" is selected, the CPU 103 decides, as the relationship, that the condition for the main widget is met when states of all the sub-widgets match. That is, the alert condition for the alert indicator 85 as the main widget is met when all the alert conditions for the sub-indicator 851, the sub-indicator 852, the sub-indicator 853, and the sub-indicator 854 are met, or when all the alert conditions for the sub-indicator 851, the sub-indicator 852, the sub-indicator 853, and the sub-indicator 854 are not met.

When "XOR" is selected, the CPU 103 decides, as the relationship, that the condition for the main widget is met when states of at least any one the sub-widgets are different from other (s). That is, the CPU 103 decides that the condition for the main widget is met when at least any one of the alert conditions for the sub-indicator 851, the sub-indicator 852, the sub-indicator 853, and the sub-indicator 854 are not met while the alert condition(s) for the other sub-indicator(s) are met, or when at least any one of the alert conditions for the sub-indicator 851, the sub-indicator 852, the sub-indicator 853, and the sub-indicator 854 are met while the alert condition(s) for the other sub-indicator(s) are not met.

Additionally, the user may also set a relationship such that the condition for the main widget is met when the number of the sub-widgets the conditions for which are met reaches a predetermined number (3, for example). Further, it is also possible to set multi-step relationships with the indication color of the main widget being changed multi-stepwise. On decision that a first-step condition for the main widget is met when the conditions for two sub-widgets are met, the indication color of the main widget (alert indicator 85) is changed to yellow. On decision that a second-step condition for the main widget is met when the conditions for all the sub-widgets are met, the indication color of the main widget (alert indicator 85) is changed to red.

This enables the user to manage a plurality of devices or a plurality of functions integrally through one main widget. For example, the user sets device temperatures as the conditions for a plurality of sub-widgets. Then, if the user sets "OR" as the relationship, it is possible to perform an alert notification on decision that the condition for the main widget is met when a temperature of any one of the devices in the sound system exceeds a threshold value.

Also, it is possible for the user to cause an alert notification when a specific condition for a specific device or a specific function is met. For example, in the fader of the mixer, setting of greater than or equal to 0 dB is also acceptable, so that it is possible to cause the level of the output signal to be greater than that of the input signal. The greater-than-or-equal-to-zero dB setting for a fader of a certain portion on the sound system influence slightly; however, if many greater-than-or-equal-to-zero dB settings are made for a plurality of portions, there is a possibility that the signal level increases substantially. On that account, the user sets the condition for each sub-widget such that each fader value is greater than or equal to 0 dB, and sets "AND" as the relationship. This makes it possible to perform an alert notification on decision that the condition for the main widget is met when the fader values for all the plurality of faders become greater than or equal to 0 dB simultaneously.

Figure 10:
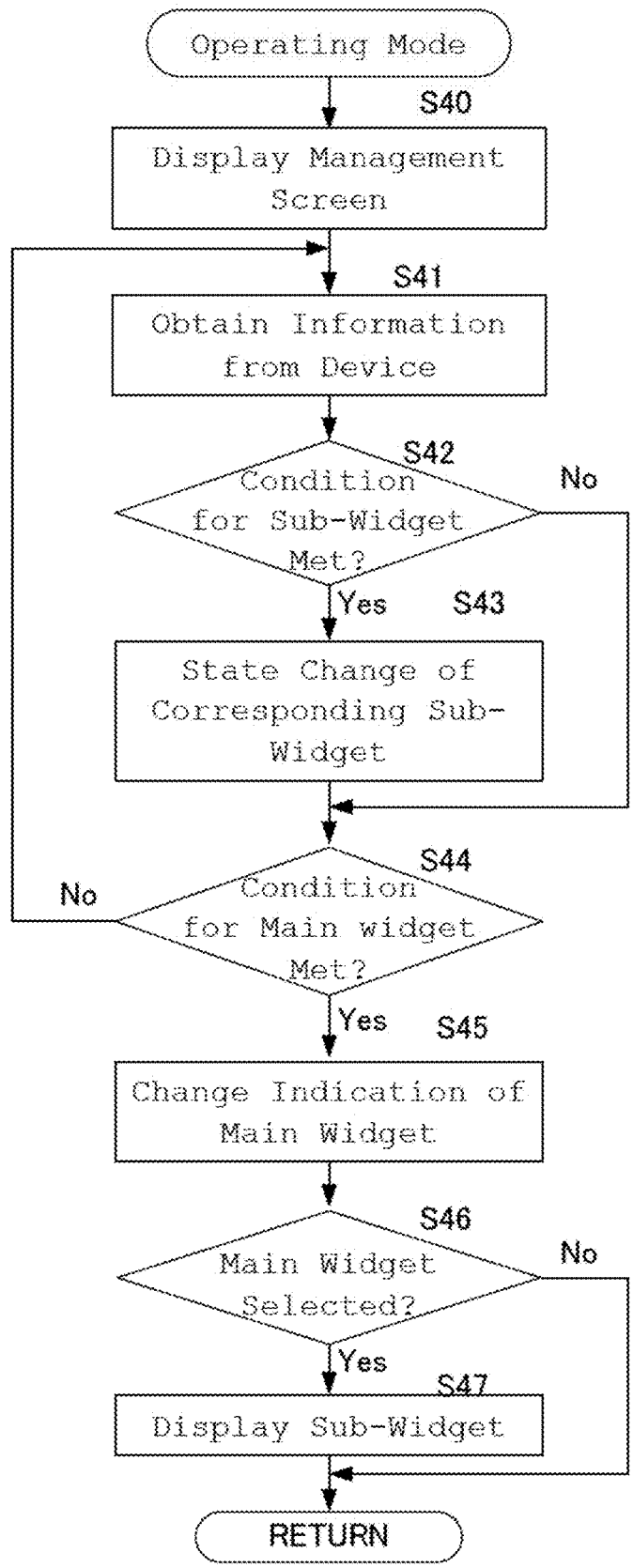
FIG. 10 is a flow chart showing an operation of the PC in an operating mode.

Subsequently, FIG. 10 is a flow chart showing an operation of the PC in an operating mode. FIG. 11A, FIG. 11B, FIG. 11C and FIG. 11D are diagrams showing an example of the display screen in the operating mode. Although the operating mode may be carried out in the laptop PC 11, in this embodiment, it is assumed that the operation shown in FIG. 10 is carried out in the tablet PC 12 that has increased portability. The tablet PC 12 has a configuration similar or same to that of the laptop PC 11 shown in FIG. 2.

Figure 11A:
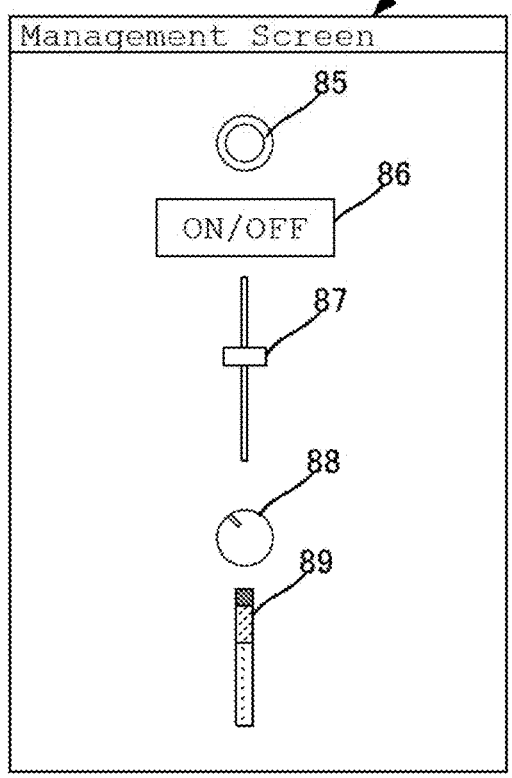
FIG. 11A is a diagram showing an example of the GUI in the operating mode.

The CPU 103 of the tablet PC 12, in the operating mode, first causes a management screen 70 as shown in FIG. 11A to be displayed (S40). On the management screen 70, as shown in FIG. 11A, only the main widgets are displayed, and no sub-widget is displayed. Therefore, the management screen 70 has just a small area on the display; and this is preferable for mobile information processing devices such as tablet PC 12 (or smart phone) or the like with a small display area.

The CPU 103 obtains information on each device or each function thereof that is connected through the network (S41). The CPU 103 obtains, from each device, a parameter value (level, temperature, power consumption, load impedance or the like) for a function as a management target.

The CPU 103, comparing an obtained present value for each device or each function with a condition (threshold value) set for each sub-widget, determines whether or not a condition for each sub-widget is met (S42). The CPU 103, on determining that a condition for a sub-widget is met (S42, Yes), causes the state of the relevant sub-widget to change (S43). The CPU 103, on determining that a condition for a sub-widget is not met (S42, No), omits the processing of S43. However, in the example of FIG. 11A, since the main widgets are displayed but no sub-widget is displayed on the management screen 70, it is not possible to visually recognize that there is a change in state of any sub-widget until the condition for a main widget is met.

Figure 11B:
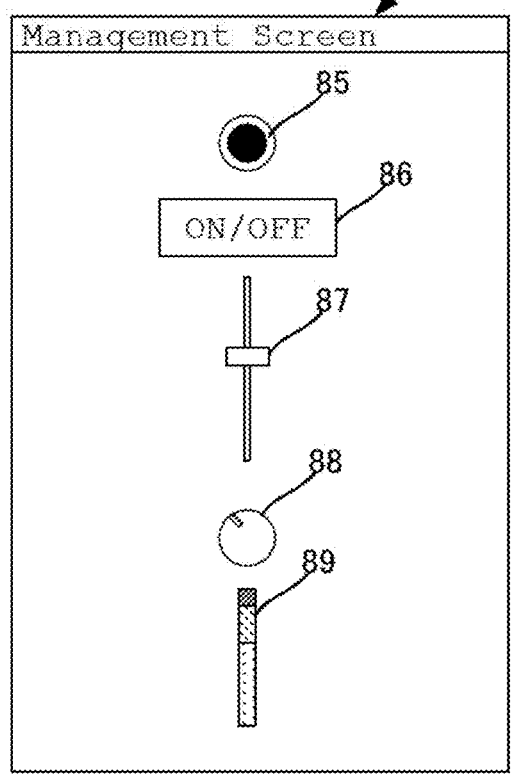
FIG. 11B is an example of the GUI in the operating mode.

Then, the CPU 103 determines whether or not a condition for a main widget is met (S44). The CPU 103 determines that the condition for the main widget is met when one or more conditions for the sub-widgets meet the above-mentioned relationship (logical expression). When the condition for the main widget is met (S44, Yes), the CPU 103 causes the indication of the main widget to change (S45). For example, as shown in FIG. 11B, the CPU 103 causes the alert indicator 85 to be turned on. The CPU 103, on determining that the condition for the main widget is not met (S44, No), repeats form the processing of S41.

After completing the processing of S45, the CPU 103 further determines whether or not the selection of a main widget has been made (S46). When a main widget is selected (S46, Yes), the CPU 103 causes sub-widgets corresponding to the selected main widget to be displayed (S47). The CPU 103, on determining that a main widget is not selected (S46, No), omits the processing of S47.

Figure 11C:
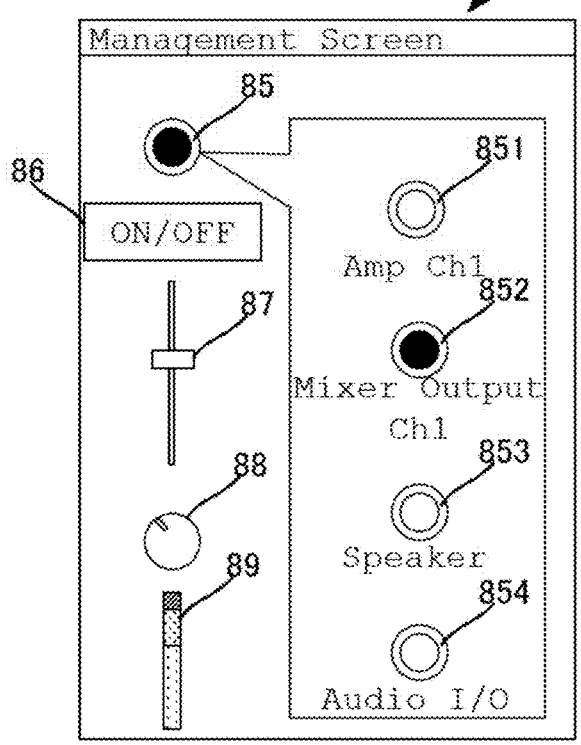
FIG. 11C is an example of the GUI in the operating mode.

For example, as shown in FIG. 11C, when the alert indicator 85 is selected, the CPU causes the sub-indicator 851, the sub-indicator 852, the sub-indicator 853 and the sub-indicator 854 to be displayed. In this example, for each sub-widget a device name is displayed. In a case of performing management of a specific function and a specific channel, names for these function and channel are also displayed.

Figure 11D:
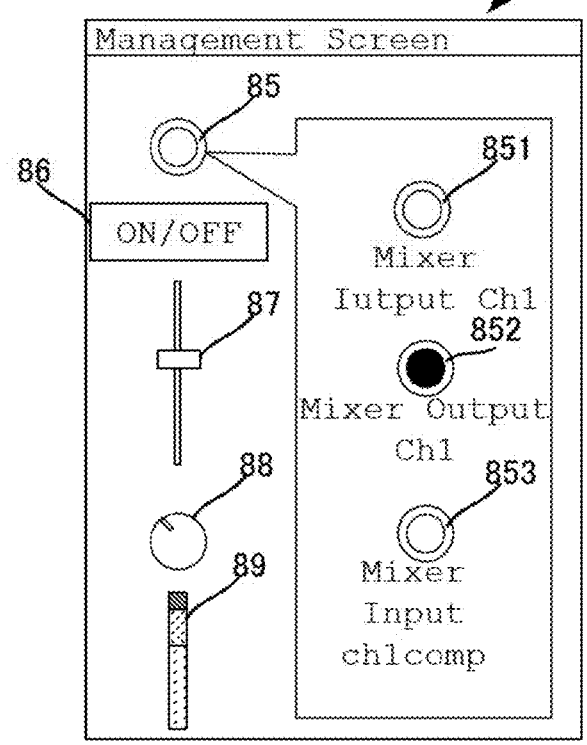
FIG. 11D is an example of the GUI in the operating mode.

In the example of FIG. 11C, because the level of the output channel 1 of the audio mixer 13 exceeds a predetermined threshold value and "OR" is set as the relationship with the main widget, both the alert indicator 85 and the sub-indicator 852 are in turn-on states. As shown in FIG. 11D, it is assumed that the level controller of the input channel 1 is assigned to the sub-indicator 851, that the level controller of the output channel 1 is assigned to the sub-indicator 852, and that a gain of a compressor of the input channel 1 is assigned to the sub-indicator 853. In this case, further, if "AND" is set as the relationship between the sub-widgets and the main widget, the alert indicator 85 remains turned-off even when the level of the output channel 1 of the audio mixer 13 exceeds a predetermined threshold value.

As stated above, the sound system according to the embodiment of the present invention makes it possible to manage a plurality of any devices or any functions integrally through the main widget even when the number of the devices increases.

Further, although in the operation example of FIG. 10, an example in which the tablet PC 12 obtains a present value of each function from each device is shown, the present invention is not limited to this instance. The PC 12 in an operating mode performs, for example, an operation of comparing a present value at each device with a condition (threshold value) for a sub-widget. Then, in this operation mode, such a procedure that if the condition for the sub-widget is met (if the threshold value is exceeded by the present value) information to the effect that the condition is met is transmitted from the device to the tablet PC 12 may be acceptable.

Also, such a procedure that the tablet PC 12 compares a present value obtained from a certain device with the condition whereas from another device if the condition for the sub-widget is met (if the threshold value is exceeded by the present value) information to the effect that the condition is met is transmitted to the tablet PC 12 may be acceptable.

The above explanations of the embodiments are nothing more than illustrative in any respect, and are not restrictive. Scope of the present invention is indicated by claims rather than the above embodiments. Further, it is intended that all changes that are equivalent to a claim in the sense and realm of the doctrine of equivalence be included within the scope of the present invention. For example, as stated above, since each device may be connected through the MIDI, naturally, electronic instruments are also among examples of the devices capable of being associated with the sub-widgets. Of course, the equipment capable of being associated with a sub-widget is not limited to audio equipment. For example, communication equipment such as rooter, hub, switch or the like may also be associated with a sub-widget.

Also, for example, it is possible to define that the ON/OFF button 86, the slider 87, the knob 88 and the meter 89 meet the conditions for the main widgets when values for the respective sub-widgets meet predetermined conditions. For example, in the case of the ON/OFF button 86, the display of the ON/OFF button 86 can be changed to "ON" state when the devices (or the functions) associated with all the sub-widgets are turned on. Moreover, for example, in the case of the slider 87, it is also possible to define that the value (fader value) of the slider 87 indicates −∞ dB when fader values associated with all the sub-widgets (a plurality of faders) are not greater than a predetermined threshold value (for example, 0 dB).

Further, as to the slider 87, it is also possible to define that the value of the slider 87 indicates 0 dB when the fader values associated with all the sub-widgets exceeds a predetermined threshold value (for example, 0 dB). As abovementioned, in the case of the mixer, if settings that exceed 0 dB are made at the same time at a plurality of portions, there is a possibility that the signal level increases significantly. In the case of this example, the user can deem that settings that exceed 0 dB are made at the same time at a plurality of portions when the value of the slider 87 of the main widget changes to 0 dB. In the same manner, in the case of the knob 88 as well, it is also possible to define that the value of the knob 88 indicates a minimum value when gains associated with all the sub-widgets (a plurality of knobs) are not greater than threshold values. Further, as to the knob 88, for example, it is also possible to define that the value of the knob 88 indicates a maximum value when the values of the knobs associated with all the sub-widgets exceed the threshold values.

What is claimed is:

1. An information display apparatus comprising:
a display that displays widgets including a main widget and a plurality of sub-widgets that indicate a state of an audio device or a state of a function installed on the audio device;
a receiver that receives user's operation;
an information obtainer that obtains information from the audio device; and
a controller that executes:
a process of placing the plurality of sub-widgets to the main widget;
a process of setting the audio device or the function that is associated with each of the plurality of sub-widgets;
a process of setting a condition for the audio device or a condition for the function that is associated with each of the plurality of sub-widgets;
a process of setting a relationship between conditions set for the plurality of sub-widgets and a condition set for the main widget; and
a process of setting a threshold value as the setting of the condition through the receiver, wherein:
the relationship between the plurality of sub-widgets and the main widget is such that the condition for the main widget is defined by a logical expression of the conditions set for the plurality of sub-widgets;
the plurality of sub-widgets are indicators that are turned on when a present value of the audio device or the function exceeds the threshold value; and
the main widget is indicator that is turned on when the logical expression is satisfied.

2. The information display apparatus according to claim 1, wherein
the controller obtains, through the receiver, setting of a threshold value as the setting of the condition; and
the main widget and the plurality of sub-widgets are indicators that are turned on when a present value of the audio device or the function exceeds the threshold value.

3. The information display apparatus according to claim 1, wherein the controller causes an indication of the main widget to change on deciding that the condition for the main widget is met when the information from the audio device that is obtained by the information obtainer meets the condition with respect to at least one sub-widget among the plurality of sub-widgets.

4. The information display apparatus according to claim 1, wherein the controller causes an indication of the main widget to change on deciding that the condition for the main widget is met when the information from the audio device that is obtained by the information obtainer meets the condition with respect to all the sub-widgets among the plurality of sub-widgets.

5. The information display apparatus according to claim 1, wherein the controller causes an indication of the main widget to change on deciding that the condition for the main widget is met when the information from the audio device that is obtained by the information obtainer meets the condition with respect to all the sub-widgets among the plurality of sub-widgets, or when the information from the audio device that is obtained by the information obtainer does not meet the condition with respect to all the sub-widgets among the plurality of sub-widgets.

6. The information display apparatus according to claim 1, wherein the controller causes an indication of the main widget to change on deciding that the condition for the main widget is met when the information from the audio device that is obtained by the information obtainer does not meet the condition with respect to at least any one sub-widget among the plurality of sub-widgets and meets the condition with respect to at least any one sub-widget among other sub-widgets, or when the information from the audio device that is obtained by the information obtainer meets the condition with respect to at least any one sub-widget among the plurality of sub-widgets and does not meet the condition with respect to at least any one sub-widget among other sub-widgets.

7. The information display apparatus according to claim 1, wherein the audio device includes audio equipment; and at least one of the main widget or the plurality of sub-widgets indicate a state of the audio equipment or the function installed on the audio equipment.

8. The information display apparatus according to claim 1, wherein the main widget is an alert indicator.

9. An information display method comprising steps of:
  displaying widgets that include a main widget and a plurality of sub-widgets that indicate a state of an audio device or a state of a function installed on the audio device;
  receiving a user's operation;
  obtaining information from the audio device;
  placing the plurality of sub-widgets to the main widget;
  setting the audio device or the function that is associated with each of the plurality of sub-widgets;
  setting a condition for the audio device or a condition for the function that is associated with each of the plurality of sub-widgets;
  setting a relationship between conditions set for the plurality of sub-widgets and a condition set for the main widget; and
  setting a threshold value as the setting of the condition through the receiving of the user's operation, wherein:
  the relationship between the plurality of sub-widgets and the main widget is such that the condition for the main widget is defined by a logical expression of the conditions set for the plurality of sub-widgets;
  the plurality of sub-widgets are indicators that are turned on when a present value of the audio device or the function exceeds the threshold value; and
  the main widget is indicator that is turned on when the logical expression is satisfied.

10. The information display method according to claim 9 further comprising steps of: obtaining, through a receiver receiving the user's operation, setting of a threshold value as the setting of the condition, wherein the main widget and the plurality of sub-widgets are indicators that are turned on when a present value of the audio device or the function exceeds the threshold value.

11. The information display method according to claim 9 further comprising steps of:
  changing an indication of the main widget on deciding that the condition for the main widget is met when the information from the audio device that is obtained meets the condition with respect to at least one sub-widget among the plurality of sub-widgets.

12. The information display method according to claim 9 further comprising steps of:
  changing an indication of the main widget on deciding the condition for the main widget is met when the information from the audio device that is obtained meets the condition with respect to all the sub-widgets among the plurality of sub-widgets.

13. The information display method according to claim 9 further comprising steps of: changing an indication of the main widget on deciding that the condition for the main widget is met when the information from the audio device that is obtained meets the condition with respect to all the sub-widgets among the plurality of sub-widgets, or when the information from the audio device that is obtained does not meet the condition with respect to all the sub-widgets among the plurality of sub-widgets.

14. The information display method according to claim 9 further comprising steps of: changing an indication of the main widget to change on deciding that the condition for the main widget is met when the information from the audio device that is obtained by the information obtainer does not meet the condition with respect to at least any one sub-widget among the plurality of sub-widgets and meets the condition with respect to at least any one sub-widget among other sub-widgets, or when the information from the audio device that is obtained by the information obtainer meets the condition with respect to at least any one sub-widget among the plurality of sub-widgets and does not meet the condition with respect to at least any one sub-widget among other sub-widgets.

15. The information display method according to claim 9, wherein at least one of the main widget or the plurality of sub-widgets indicate a state of audio equipment included in the audio device or of the function installed on the audio equipment.

16. The information display method according to claim 9, wherein the main widget is an alert indicator.

* * * * *